United States Patent [19]

Sorensen et al.

[11] Patent Number: 4,915,466
[45] Date of Patent: Apr. 10, 1990

[54] REVERSIBLE OPTICAL OR ELECTRO-OPTICAL CONNECTOR

[75] Inventors: Jay R. Sorensen, Aloha; Jack M. Millay; Joseph D. LaPerna, both of Beaverton, all of Oreg.

[73] Assignee: SpaceLabs, Inc., Bothell, Wash.

[21] Appl. No.: 244,986

[22] Filed: Sep. 15, 1988

[51] Int. Cl.⁴ ................................................. G02B 6/36
[52] U.S. Cl. .................................. 350/96.2; 350/96.15
[58] Field of Search ................. 350/96.2, 96.21, 96.22; 439/353, 299, 310, 341, 345

[56] References Cited

U.S. PATENT DOCUMENTS

| | | | |
|---|---|---|---|
| 1,016,728 | 2/1912 | Barber | 439/341 X |
| 2,369,860 | 2/1945 | Schroeder | 439/341 X |
| 2,899,669 | 8/1959 | Johanson | 439/341 X |
| 3,543,218 | 11/1970 | Archer | 439/345 X |
| 4,082,400 | 4/1978 | Gonsert | 439/345 X |
| 4,427,879 | 1/1984 | Becher et al. | 350/96.18 X |
| 4,526,431 | 7/1985 | Kasukawa | 439/353 X |
| 4,715,675 | 12/1987 | Kevern et al. | 350/96.21 X |
| 4,736,100 | 4/1988 | Vastagh | 350/96.2 X |
| 4,762,388 | 8/1988 | Tanaka et al. | 350/96.21 X |
| 4,798,440 | 1/1989 | Hoffer et al. | 350/96.21 X |

Primary Examiner—Jonn D. Lee
Assistant Examiner—John Ngo
Attorney, Agent, or Firm—Seed and Berry

[57] ABSTRACT

An electro-optical connector having a plug containing a center light emitter or detector and an interconnected pair of light detectors or emitters symmetrically positioned with respect to the center light emitter or detector. A socket, also containing a center light detector or emitter and an interconnected pair of symmetrically positioned outer light emitters or detectors, is adapted to receive the plug. The plug may thus be inserted into the socket with a plurality of angular orientations. The plug is retained in the socket by a pair of resilient tabs extending into respective recesses in the socket. The tabs may be removed from the recesses by exerting an outward force on the tabs, either directly or by exerting a transverse force on the plug thereby generating a rotational moment on the plug that exerts an outwardly directed force on the tab. As a result, the plug may be removed from the socket by exerting side forces on the plug without damaging the plug or socket.

10 Claims, 3 Drawing Sheets

ReVERSIBLE OPTICAL OR ELECTRO-OPTICAL CONNECTOR

FIELD OF THE INVENTION

This invention relates to optical and electro-optical connectors, and, more particularly, to an optical or electro-optical plug that can be inserted into a matching socket in either direction, and which can be removed from the socket without damage by exerting a force on the plug in virtually any direction.

BACKGROUND ART

Connectors are commonly used to connect an electrical or optical cable to electronic and/or optical instruments. Optical connectors generally include lenses or other optical devices that couple light between a plug and socket. In electro-optical connectors, electrical signals are converted to light and optically coupled between a plug and socket before being converted back to a corresponding electrical signal.

Regardless of whether the connector is of the optical or electro-optical variety, connectors are generally designed so that a plug can be inserted into a mating socket in only one direction. Yet the configuration of most plugs cause them to appear to be capable of being inserted into a mating socket in more than one direction. Specifically, rectangularly shaped plugs appear to be capable of insertion into a mating plug in either of two directions. Similarly, square plugs appear to be capable of insertion into a mating plug in any of four directions. Other connector configurations, such as circular plugs and sockets, appear to be capable of interconnecting at an infinite number or angular orientations.

The conventional connectors described above are generally prevented from interconnecting with each other in more than one angular orientation by a matching key and keyway on the plug and socket. However, such keys and keyways are often not very visible, thus creating an apparent ambiguity in the angular orientation of the plug relative to the socket. This apparent ambiguity can make it difficult to insert conventional plugs in their mating sockets.

Another problem arising from the use of conventional connectors stems from the manner in which the plugs of such connectors can be pulled from their sockets. Many connectors are designed so that the interconnection between their plug and socket can be broken by merely pulling the plug from the socket, often by exerting an axial force on a cable connected to the plug. Users of these types of connectors thus become accustomed to removing the plug from the socket by merely pulling on the cable connected to the plug. This technique is satisfactory as long as the cable extends from plug in a direction that is substantially aligned with the direction that the plug moves when it is pulled from the socket. However, when the cable extends from the plug at an angle, attempts to remove the plug by exerting an axial force on the cable exerts a side force on the plug that can damage the plug.

DISCLOSURE OF THE INVENTION

It is an object of the invention to provide an optical or electro-optical connector having a plug that can be inserted in a socket in a plurality of directions.

It is another object of the invention to provide an optical or electro-optical connector having a plug that can be pulled from its socket without being damaged by exerting an axial force on a cable connected to the plug even when the cable extends from the plug at an angle.

These and other objects of the invention are provided by an optical or electro-optical connector having a plug and a socket. The plug includes a center optical coupling member and at least one pair of outer optical coupling members symmetrically positioned with respect to the center optical coupling member. Each pair of outer optical coupling members are coupled to each other so that they output or receive the same optical signals. The socket similarly includes a center optical coupling member and at least one pair of outer optical coupling members symmetrically positioned with respect to the center optical coupling member. The outer optical coupling members of each pair are also coupled to each other so that they output or receive the same optical signals. The center optical coupling member and each pair of the outer coupling members of the socket are positioned at locations that correspond to the positions of the respective center optical coupling member and each pair of outer optical coupling members of the plug. As a result, when the plug is inserted into the socket, the center optical coupling member of the plug is positioned adjacent the center optical coupling member of the socket and the pairs of outer optical coupling members of the plug are positioned adjacent corresponding pairs of outer optical coupling members of the sockets. The inner optical coupling member of the plug and the outer coupling members of the socket may be light-emitting devices that generate light corresponding to a received electrical signal, and the inner optical coupling member of the socket and the outer optical coupling members of the plug may be light-detecting devices that generate an electrical signal corresponding to light received by the light-detecting devices. The plug may further include a pair of releasable latch members projecting from a forward edge of the plug at spaced-apart locations. The latch members are inserted in respective recesses located at positions on the socket corresponding to the positions of the latch members. The latch members are removable from the recesses by exerting a force on the latch members away from the recesses. As a result, a lateral force exerted on the plug applies a pivotal moment to the plug that withdraws at least one of the latch members from the recess in which it is inserted. The latch members may be formed by a resilient tab projecting from the plug having a projection extending transversely across one face. Each of the recesses is rectangularly shaped to receive a respective tab, and each recess preferably has formed therein a transverse groove adapted to receive the projections of a respective tab.

BEST MODE FOR CARRYING OUT THE INVENTION

Figure 1:
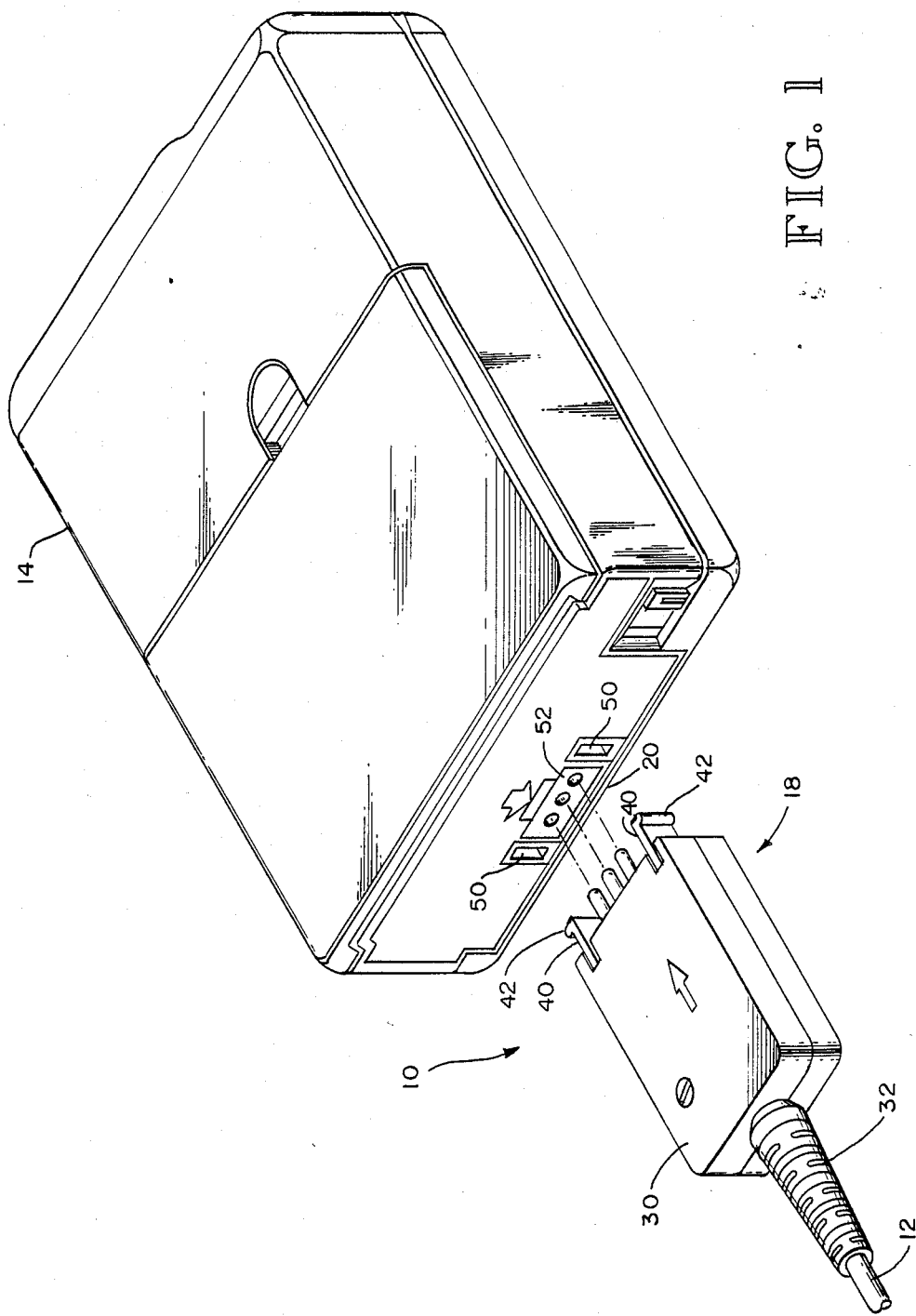
FIG. 1 is an isometric view of a plug of one embodiment of the inventive connector being inserted into a socket mounted in an electronic device.

With reference to FIG. 1, the inventive connector 10 is illustrated in use connecting an electrical cable 12 to an electronic instrument 14. The connector includes a plug 18 mounted on the end of the cable 12 and a socket 20 mounted in the electronic instrument 14.

The plug 18 includes a plug body 30 connected to the cable 12 through a resilient strain relief member 32. As is well known in the art, the strain relief member 32 prevents excessive bending of the cable 12 and it couples axial forces from the cable 12 to the plug body 30 so that excessive strains are not exerted on wires extending through the cable 12 and terminating inside the plug body 30. A pair of spaced apart, resilient tabs 40 project from the forward face of the plug body 30. Transverse projections 42 are formed on the respective tabs 40.

The socket 20 includes a pair of rectangularly-shaped recesses 50 into which respective tabs 40 are inserted. As explained in greater detail below, light-emitting and light-detecting devices are positioned along a center window 52 of the socket between the recesses 50.

Figure 2:
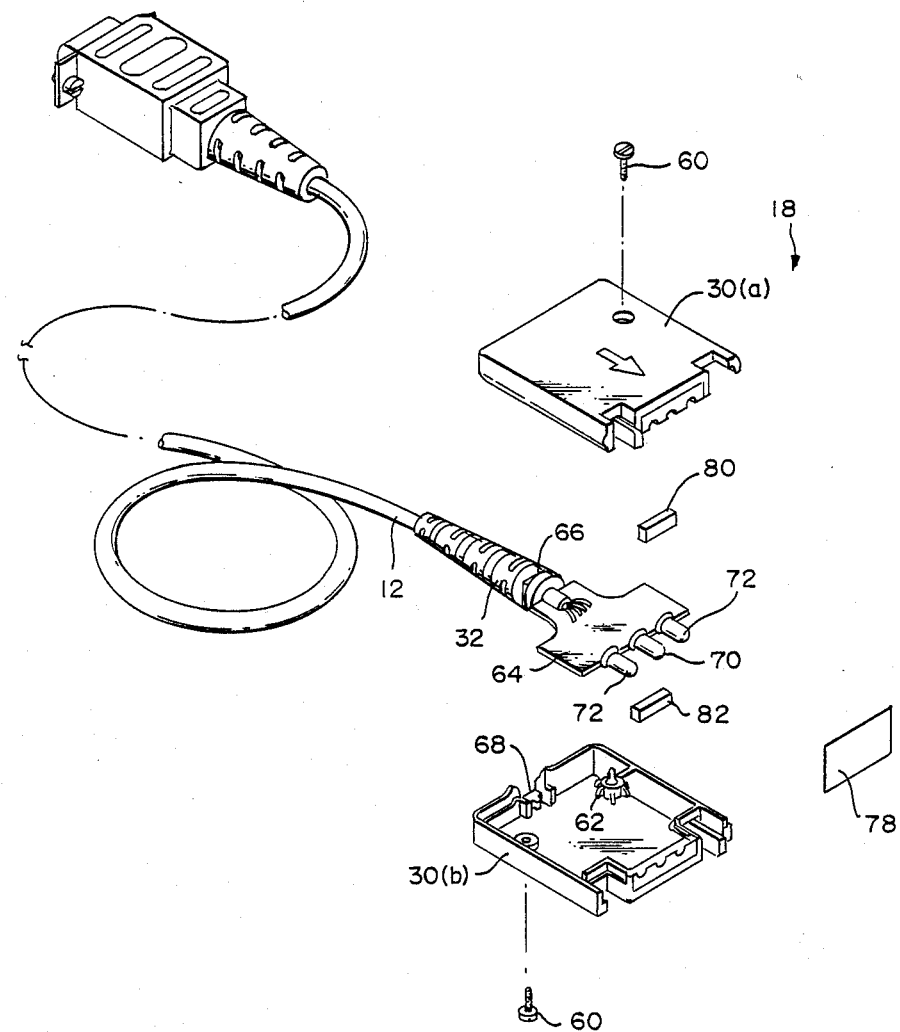
FIG. 2 is an exploded isometric view of the plug of FIG. 1.

The internal components of the plug 18 and socket 20 are illustrated in greater detail in FIG. 2. The plug body 30 is formed in two sections 30a, 30b, which are secured together by a pair of screws 60 threaded into respective bosses 62. The cable 12 extends through the strain relief member 32 and its internal wires terminate on a conventional printed circuit board 64. A notch 66 formed in the strain relief member 32 receives the edges of an aperture 68 formed in the plug body 30 to prevent axial movement of the strain relief member 32.

A conventional light-emitting device 70, which may be a light-emitting diode or infra-red emitter, is mounted on the printed circuit board 64 along the forward edge thereof. A pair of conventional, identical light-detecting devices 72 are also mounted on the forward edge of the printed circuit board 64 on opposite sides of the light-emitting device 70. The light-detecting devices 72 are thus symmetrically positioned with respect to the light-emitting device 70. The light-emitting device 70 and light-detecting devices 72 project forwardly from the printed circuit board 64 through respective semicircular cutouts 80 formed in the upper and lower sections of the plug body 30. A window 78 is mounted on the plug body 30 in front of the light-emitting device 70 and the light-detecting devices 72. A pair of bar magnets 80, 82, may be positioned along the forward face of the plug body 30 on opposite sides of the light-emitting device 70 and light-detecting devices 72. A magnetic reed switch (not shown) mounted in the socket 20 can then detect when the plug 18 has been plugged into the socket 20.

Although the embodiment illustrated in FIG. 2 utilizes a light-emitting device 70 positioned between two light-detecting devices 72, it will be understood that a single light-detecting device may be positioned between two light-emitting devices. Also, the connector 10 can accommodate additional channels of information by installing additional pairs of light-emitting devices or light-detecting devices on the printed circuit board 64 as long as they are symmetrically positioned with respect to the center light-emitting device or detector.

Figure 3:
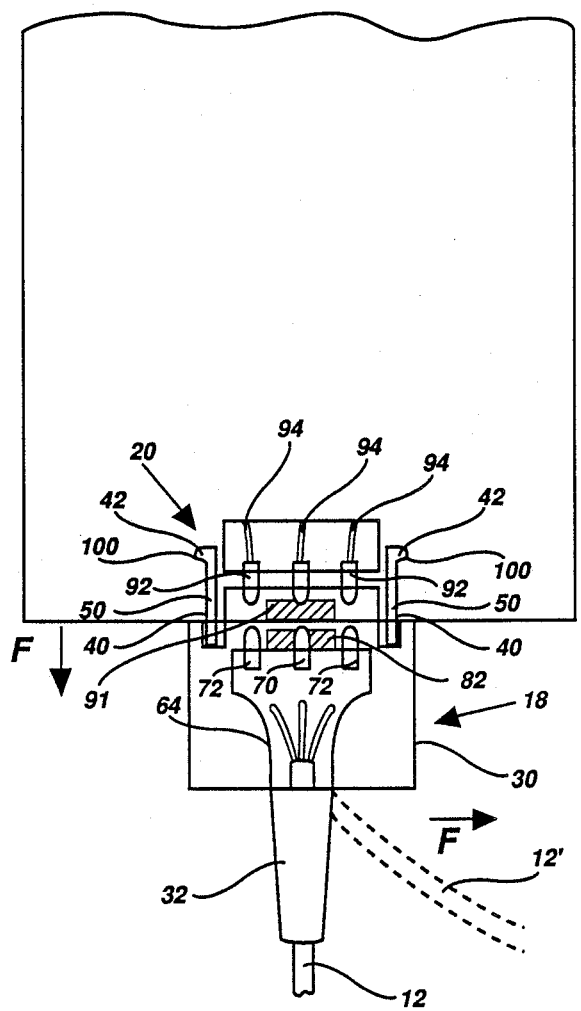
FIG. 3 is a plan view of the plug of FIG. 1 inserted in the socket of FIG. 1.

The plug 18 is shown inserted in the socket 20 in FIG. 3. The light-emitting device 70 is positioned opposite a conventional light-detecting device 90 while the light-emitting devices 72 are positioned opposite respective conventional light-emitting devices 92. The light-detecting device 90 and light-emitting devices 92 are connected to circuitry within the instrument 14 through respective wires 94. A conventional magnetic reed switch 98 is positioned beneath the light-detecting device 90 and light-emitting devices 92. Thus, when the plug 18 is inserted into the socket 20, as illustrated in FIG. 3, the reed switch 98 detects the magnetic field generated by the magnet 82 to generate an electrical indication that the plug 18 has been inserted into the socket 20.

As also illustrated in FIG. 3, the tabs 40 of the plug are inserted into the recesses 50 with the projections 42 received in respective transverse grooves 100 formed in the recesses 50. The tabs 40 are formed from conventional resilient material so that they releasable restrain the plug 18 within the socket 20. However, an axial force applied to the plug body 30, either directly or through the cable 12, removes the projections 42 from their respective grooves 10 thereby allowing the tabs 40 to be pulled from their respective recesses 50.

Although the tabs 40 and recesses 50 are illustrated in the Figures as being rectangular, it will be understood that other configurations can be used. For example, the tabs can be cylindrical or semi-cylindrical with a radial projection formed at one end. The recess would then by cylindrical or semicylindrical to match the shape of the recess.

As mentioned, conventional plugs are often designed to be removed from their sockets by exerting an axial force on a cable connected to the plug. These conventional designs are satisfactory as long as the cable extends from the plug along its axis of movement as it is withdrawn from the socket 20. However, when the cable extends to the side of the plug, pulling on the cable to remove the plug can often damage the plug and/or socket. The inventive connector does not suffer from this limitation. As best illustrated in FIG. 3, in the event that the cable 12' extends from the plug body 30 at an angle, a transverse force F is thereby exerted on the plug body 30. This transverse force generates a counterclockwise rotational moment M about the rightmost tab 40 thereby causing the plug body 30 to exert an outward force F' on the left-most tab 40. As a result, the left-most tab 40 is withdrawn from its respective recess 50. The right-most tab 40 then begins to bend in response to the moment M. However, this bending causes the projection 42 to release from the groove 100. Furthermore, the resiliency of the tab 40 causes the tab to curve in an arc. As a result, the tab 40 is withdrawn from the recess 50. The inventive plug 18 can thus be withdrawn from the socket 20 by pulling on the cable 12 at any angle without damaging either the plug 18 or the socket 20.

The inventive plug 18 may also be withdrawn from its socket 20 without damaging the plug 18 or socket 20 by exerting a force on the cable 12 when the cable extends from the plug body 30 at a vertical angle as well as at a horizontal angle. The tabs 40 have widths that are smaller than the thickness of the plug body 30. As a result, whenever the cable 12 extends either downwardly or upwardly from the plug body 30 and an axial force is exerted on the cable 12, the lower or upper forward edge of the plug body 30 contacts the lower or upper edge of the socket. The axial force exerted on the cable 12 thus generates a moment about the lower or upper edge of the plug body 30 that withdraws the tabs 40 from the recesses 50 in the same manner that transverse force exerted on the cable 12 withdraws the tabs 40 from the recesses 50.

It is apparent from an examination of FIGS. 2 and 3 that the plug 18 may be inserted in the socket in either of two directions. In other words, the plug 18 may be withdrawn from the socket 20, rotated 180 degrees and then plugged in again. This reversible property of the inventive connector 10 is the result of utilizing optical coupling elements (in this case, light-emitting devices and light-detecting devices) positioned symmetrically about a center optical coupling member.

The inventive connector is reversible not only because the light-detecting devices 72 and light-emitting devices 92 are symmetrically positioned with respect to the center light-emitting device 70 and light-detecting device 90, but also because the symmetrically positioned light-detecting devices 72 and symmetrically positioned light-emitting devices 94 are interconnected. As a result, they both transmit or receive the same optical signal.

Although light-emitting devices and light-detecting devices are illustrated herein to implement the optical coupling members, it will be understood that other devices may be used. For example, although the embodiment illustrated herein is an electro-optical connector, a pure optical connector can be used. In such embodiment, optical fibers, rather than wires, would extend through the cable 12 and be coupled from the plug 18 to the socket 20 through optical coupling elements, such as lenses. In such case, the coupling elements symmetrically positioned with respect to the center coupling element would be interconnected so that the plug 18 could be inserted into the socket 20 in either of two directions.

We claim:

1. An optical or electro-optical connector, comprising:
   a plug having a center optical coupling member and at least one pair of outer optical coupling members symmetrically positioned with respect to said center optical coupling member, each pair of outer optical coupling members being coupled to each other so that they output or receive the same optical signals; and
   a socket having a center optical coupling member and at least one pair of outer optical coupling members symmetrically positioned with respect to said center optical coupling member, said outer optical coupling members of each pair being coupled to each other so that they output or receive the same optical signals, said center optical coupling member and each pair of said outer coupling members being positioned at locations that correspond to the positions of the respective center optical coupling member and each pair of outer optical coupling members of the plug so that, when said plug is inserted into said socket, the center optical coupling member of said plug is positioned adjacent the center optical coupling member of said socket and the pairs of outer optical coupling members of said plug are positioned adjacent corresponding pairs of outer optical coupling members of said socket, the center optical coupling member of said plug communicating with the center optical coupling member of said socket and the outer optical coupling members of said plug communicating with the adjacent outer optical coupling members of said socket, said plug and socket being physically adapted to interconnect with each outer optical coupling member of said plug opposite either outer optical coupling member of said socket so that said plug and socket may be reversibly interconnected without affecting the communication between said plug and socket.

2. The connector of claim 1 wherein said connector is an electro-optical connector, and wherein the inner optical coupling member of said plug and the outer coupling members of said socket are light-emitting devices each of which generate light corresponding to a received electrical signal, and wherein the inner optical coupling member of said socket and the outer optical coupling members of said plug are light-detecting devices each of which generate an electrical signal corresponding to light received by said light-detecting devices.

3. The connector of claim 2 wherein said light-emitting devices generate light at an infrared-red wavelength, and wherein said light-detecting devices detect light at infrared-red wavelengths.

4. The connector of claim 1 wherein said connector is an electro-optical connector, and wherein the inner optical coupling member of said socket and the outer coupling members of said plug are light-emitting devices each of which generate light corresponding to a received electrical signal, and wherein the inner optical coupling member of said plug and the outer optical coupling members of said socket are light-detecting devices each of which generate an electrical signal corresponding to light received by said light-detecting devices.

5. The connector of claim 4 wherein said light-emitting devices generate light at an infrared-red wavelength, and wherein said light-detecting devices detect light at infrared-red wavelengths.

6. The connector of claim 1 wherein said plug and socket each contain a single pair of outer optical coupling members.

7. The connector of claim 6 wherein said center and outer optical coupling members are arranged in a linear array.

8. The connector of claim 1 wherein said plug further includes a pair of releasable latch members projecting from a forward edge of said plug at spaced-apart locations, and wherein said socket further includes a pair of recesses located at positions on said socket corresponding to the positions of said latch members, each of said recesses being adapted to receive a respective latch member, said latch members being removable from said recesses by exerting a force on said latch members away from said recesses whereby a lateral force exerted on said plug applies a pivotal movement to said plug that withdraws at least one of said latch members from the recess in which it is inserted.

9. The connector of claim 8 wherein each of said latch members comprise a resilient tab projecting from said plug, said tab having a projection extending transversely across one face thereof, and wherein each of said recesses is rectangularly shaped to receive a respective tab, said recess having formed therein a transverse groove adapted to receive the projection of said tab.

10. The connector of claim 8 wherein said tabs have widths that are smaller than the thickness of said plug so that a force having a component extending normal to the thickness of said plug causes a rotational moment to be generated about an edge of said plug adjacent said socket.

* * * * *